Aug. 7, 1928.  
W. T. EMMES  
1,680,141  
REVERSING AND BRAKING MECHANISM FOR MACHINE TOOLS  
Original Filed April 16, 1924  2 Sheets-Sheet 2
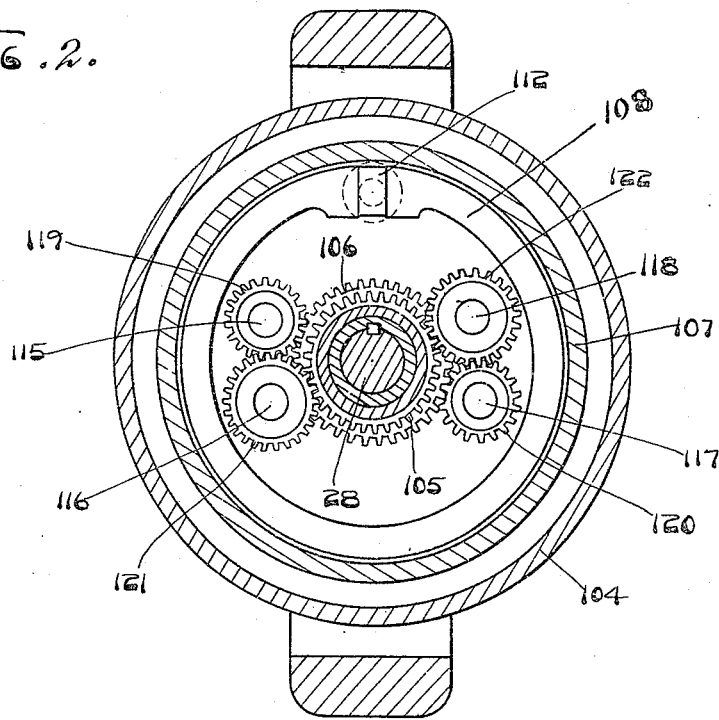
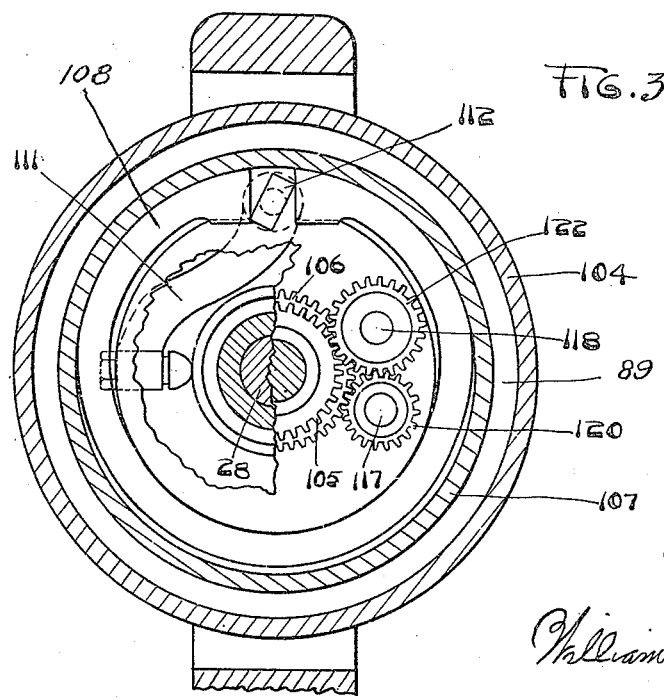
INVENTOR  
William T. Emmes Patented Aug. 7, 1928.

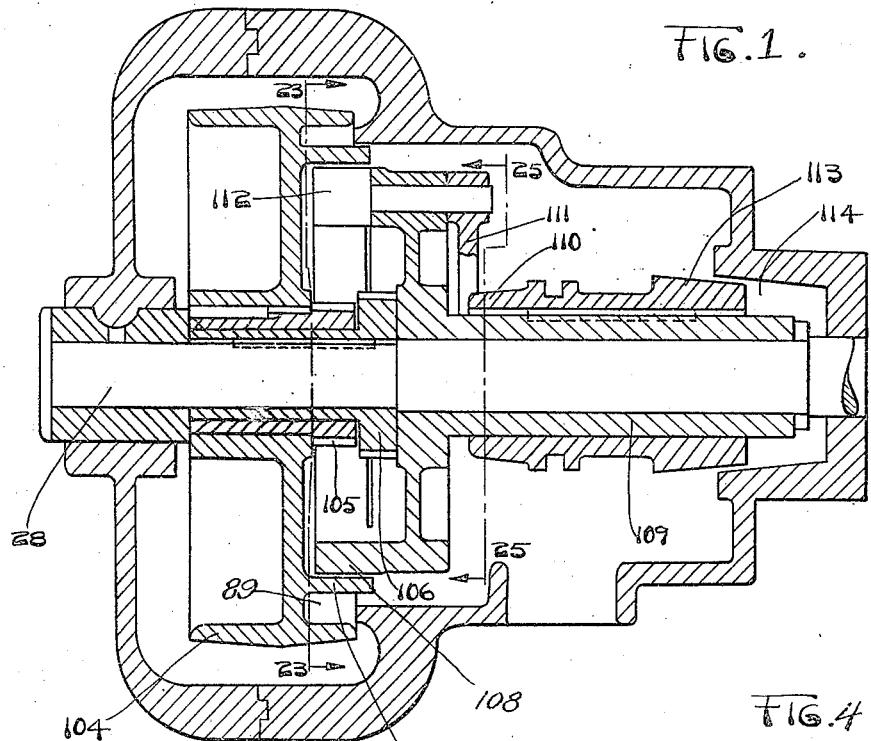
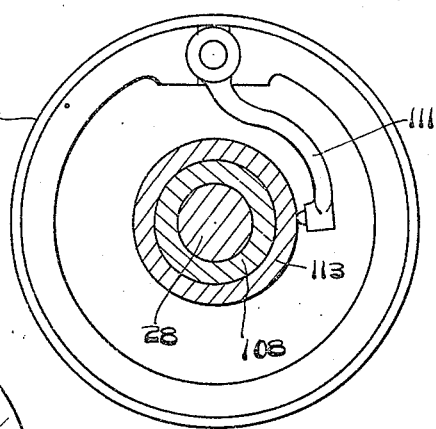
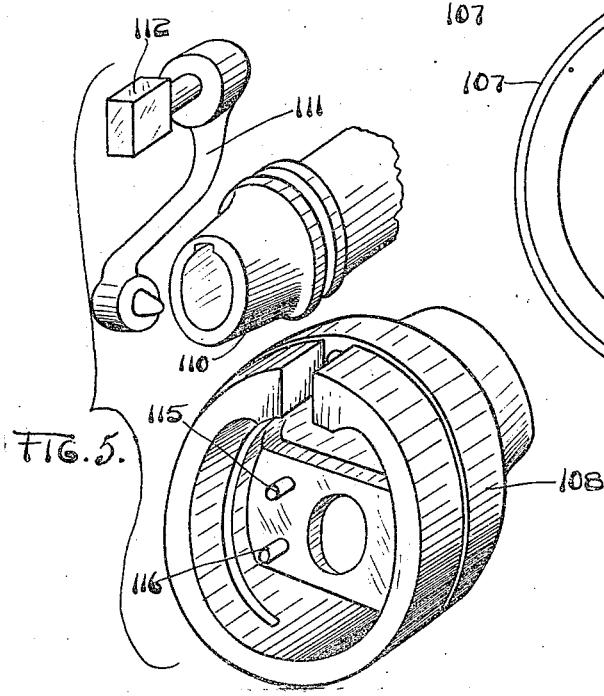

1,680,141

UNITED STATES PATENT OFFICE.

WILLIAM T. EMMES, OF CINCINNATI, OHIO.

REVERSING AND BRAKING MECHANISM FOR MACHINE TOOLS.

Original application filed April 16, 1924, Serial No. 707,004. Divided and this application filed October 4, 1924. Serial No. 741,599½.

The invention described herein is divisional of the application filed by me upon April 16, 1924, under Serial No. 707,004, and entitled Change speed and reversing mechanism for machine tools. In the invention to be described, the reversing and braking features have been set forth separately.

An object of this invention is to produce a reversing and braking mechanism which will be adaptable to any type of machine tool in which reversing and braking mechanisms are employed.

A further object is to produce a braking mechanism which will operate with considerable ease and which may, without changing the operative features of the braking mechanism, be quite easily adapted to use jointly as a braking or reversing mechanism or as a braking and reversing mechanism.

These and other objects, are attained in the mechanism described in the following specification and illustrated in the accompanying drawings, in which:

Fig. 1 is a sectional elevation of a braking and reversing mechanism embodying my invention.

Fig. 2 is a transverse sectional view taken on the line 23—23 of Fig. 1.

Fig. 3 is a view similar to Fig. 2, but showing the parts in relatively different positions.

Fig. 4 is a transverse sectional view taken on the line 25—25 of Fig. 1.

Fig. 5 is a composite fragmental perspective view of details of the feature of my invention I have disclosed in Figs. 1 to 4 inclusive.

The mechanism is housed in a casing 89 which contains the bearings for the drive shaft 28 which receives its power from drive pulley 104. At times during the operation of the mechanism it may be desirable to check or brake the speed of the mechanism, but at other times it may be necessary to bring about a reversed rotation of the drive shaft 28. The device for bringing about such a reversal may be embodied in the portion of the mechanism lying within casing 89 and operatively connected with the drive pulley. This feature of my invention I have illustrated fully in Figs. 1 to 5 inclusive. Drive pulley 104 of this feature of my invention is keyed upon the hub of a secondary pinion 105. This pinion is rotatably mounted on the hub of a primary pinion 106 which is keyed, as shown in Fig. 1, on the drive shaft 28. Drive pulley 104 below its rim is provided with a brake drum 107 within which an expanding brake band element 108 is mounted. The elongated hub 109 of this expanding brake band is rotatably mounted on drive shaft 28 and has splined for slidable engagement upon its outer surface a double ended cone, the forward end 110 of which engages and is adapted to operate an arm 111 which is connected with a key 112 adapted to expand the brake band element 108. The opposite end of the double cone member is provided with cone 113 which will engage the walls of a recess 114 in order that the brake band element, after it is disengaged from drum 107 may be prevented from rotating. Within brake band element 108, I have provided a somewhat planetary gear system consisting of a series of spindles 115, 116, 117, and 118 (see Fig. 2). Spindles 115 and 117 carry small elongated pinions 119 and 120 rotatably mounted thereon. The width of the teeth of these small elongated pinions is equal to that of the combined widths of the pinions 105 and 106, and the teeth of pinions 119 and 120 engage at one end with the teeth of pinion 106. The large pinions 121 and 122 are mounted upon spindles 116 and 118 and have their teeth in mesh with the opposite end of the teeth of pinions 119 and 120 as well as in mesh with the teeth of pinion 105. Thus it will be seen that when the brake band 108 is expanded, the drive pulley 104 will become rigidly connected with brake band element 108 and because of this and the prevention of the relative rotation of the pinions thereby, will operatively connect the drive pulley 104 with drive shaft 28 so that direct driving connection between the pulley and the shaft is established. However, when cone 113 is moved to engage recess 114 (see Fig. 1) brake band 108 will be contracted, as shown in Fig. 2, to disconnect pulley 104 from shaft 28. Upon engagement of cone 113 with recess 114 (see Fig. 1) the brake band element 108 will be held rigidly against rotation and as pulley 104 is rotated it will cause its connected pinion 105 to rotate its differential pinions 121 and 122 as well as differential pinions 119 and 120, so that pinion 106 will be caused to rotate in an opposite direction to that of its driving pinion 105. This then creates a reversing mechanism which will cause reverse rotation of the drive shaft 28.

The cooperation of the braking mechanism, disclosed in Fig. 1, with the drive shaft 28, is readily understood, inasmuch as the position of the double cone member 110 and 113, will govern the driving connection of pulley 104 with the mechanism or will bring about a braking action to stop the inertia of movement of the rotating elements until the reversing mechanism disclosed in Fig. 1 will have been brought into direct connection with pulley 104 and spindle 28. When cone 110 is brought into operative position, pulley 104 and shaft 28 will be directly connected, but, a complete reversal of the direction of rotation of the spindle will be accomplished when cone 113 is brought into operative position.

Having thus described my invention what I claim is:—

1. A reversing and braking mechanism comprising a drive shaft in the bearings of a stationary casing, a primary hubbed gear mounted and fastened to and on one end of said shaft, a secondary hubbed gear rotatively mounting the hub portion of the primary gear, a pulley and below the rim thereof a brake drum, said pulley by means of its hub portion mounting and being fastened to the hub portion of the secondary gear, an expanding brake band element with an elongated hub rotatively mounted on the other end of the drive shaft, said brake band element being aligned for engagement with the inner portion of the brake drum, an arm to expand the brake band element, and a double ended cone mounted in splined engagement on the elongated hub portion of the brake band elements, with means adapted to move the cone to bring one end thereof into engagement with a recess in the wall of the casing to prevent rotation of the cone or to move the cone to bring its other end for operation of the arm to a position for expanding the brake band element, and a planetary gear system mounted on the brake band element adapted to cause reverse rotation of the shaft and comprising small elongated gears, and short large gears with one end of each elongated gear thereof engaging the primary gear, while the other ends thereof engage one of the short large gears, the latter gears engaging with the secondary gear.

2. A reversing and braking mechanism comprising a drive shaft in the bearings of a stationary casing, a primary hubbed gear mounted and fastened to and on one end of said shaft, a secondary hubbed gear rotatively mounting the hub portion of the primary gear, a pulley and below the rim thereof a brake drum, said pulley by means of its hub portion mounting and being fastened to the hub portion of the secondary gear, an expanding brake band element with an elongated hub rotatively mounted on the other end of the drive shaft, said brake band element being aligned for engagement with the inner portion of the brake band, an arm to expand the brake band element, and a double ended cone mounted in splined engagement on the elongated hub portion of the brake band element, with means adapted to move the cone to bring one end thereof into engagement with a recess in the wall of the casing to prevent rotation of the cone or to move the cone to bring its other end for operation of the arm to a position for expanding the brake band element, and a planetary gear system mounted on the brake band element adapted to cause reverse rotation of the shaft and comprising elongated gears and short gears, with one end of each elongated gear engaging the primary gear, the opposite end of each elongated gear engaging one of the short gears, the short gears engaging the secondary gear.

3. A reversing and braking mechanism comprising a drive shaft in the bearings of a stationary casing, a primary hubbed gear mounted on and fastened to one end of said shaft, a secondary hubbed gear rotatively mounting the hub portion of the primary gear, a pulley and within the pulley rim a hollow brake drum, said pulley by means of its hub portion mounting and being fastened to the hub portion of the secondary gear, a hollow expanding brake band element with an elongated hub rotatively mounted on the other end of the drive shaft, said brake band element being aligned for engagement with the inside surface of the brake drum, an arm to expand the brake band element, and a double ended cone splinded for reciprocation on the elongated hub of the brake band element, with means adapted to move the cone to bring one end thereof into engagement with a recess in the wall of the casing to prevent rotation of the cone or to move the cone to bring its other end for operation of the arm to a position to expand the brake band element, and a planetary gear system mounted within and on the hollow brake band element, adapted to cause reverse rotation of the shaft, and comprising small gears and large gears, with one end of each of the small gears engaging the primary gear, the opposite end of each small gear engaging one of the large gears, the large gears engaging the secondary gear.

In witness whereof, I affix my signature.

WILLIAM T. EMMES.